United States Patent [19]

Whitehead et al.

[11] 4,201,128
[45] May 6, 1980

[54] APPARATUS FOR THE COMPACTING AND TREATMENT OF MATERIALS SUCH AS SHREDDED PAPER

[76] Inventors: Gareth D. J. Whitehead, 6 Haven Rd.; Thomas H. Gardner, 8 Haven Rd., both of St. Thomas Exeter EX28BP, England

[21] Appl. No.: 939,685

[22] Filed: Sep. 5, 1978

[30] Foreign Application Priority Data

Sep. 2, 1977 [GB] United Kingdom .............. 36704/77
Feb. 10, 1978 [GB] United Kingdom ................ 5375/78

[51] Int. Cl.² .................... B30B 15/30; B30B 15/08
[52] U.S. Cl. ....................................... 100/45; 53/529; 71/21; 100/50; 100/97; 100/218; 100/256; 422/307
[58] Field of Search ............... 100/52, 218, 45, 97, 100/256, 48, 50, 51, 232; 141/71, 80, 81; 71/21; 53/529

[56] References Cited

U.S. PATENT DOCUMENTS

| | | | |
|---|---|---|---|
| 3,426,673 | 2/1969 | Miner | 100/52 X |
| 3,613,556 | 10/1971 | Wright | 100/50 X |
| 3,625,138 | 12/1971 | Shinn | 100/218 X |
| 3,636,863 | 1/1972 | Woyden | 100/218 X |
| 3,762,311 | 10/1973 | Friedman | 100/45 X |
| 4,108,063 | 8/1978 | Randolph | 100/218 |

*Primary Examiner*—Billy J. Wilhite
*Attorney, Agent, or Firm*—Thomas J. Greer, Jr.

[57] ABSTRACT

Shredded paper for use as animal bedding material is compacted for packing by a reciprocating hydraulic compacting ram which displaces the material into an ejector chamber in a number of successive storkes. The pressure in the compacting ram is monitored by a pressure switch, and when a threshold pressure corresponding to a desired degree of compaction is reached a limit switch is effectively primed to trip the operation of an ejector ram upon completion of a compaction stroke, to eject the compacted material from the ejector chamber.

The production of fertilizer particles is also described in which shredded paper impregnated with manure after use is comminuted and at least partially dried.

4 Claims, 5 Drawing Figures

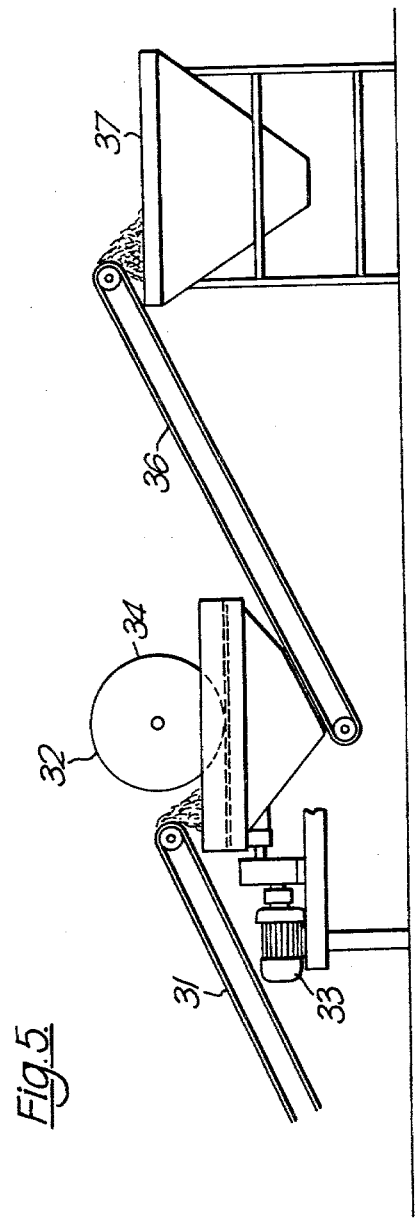

APPARATUS FOR THE COMPACTING AND TREATMENT OF MATERIALS SUCH AS SHREDDED PAPER

BACKGROUND OF THE INVENTION

This invention relates to apparatus for the compacting of material such as shredded paper.

The apparatus is applicable particularly to machines for the shredding of bulk quantities of paper such as used newsprint in order to make bulk shredded paper suitable for use as, for example, animal bedding.

An object of the invention is to provide apparatus for compacting the shredded paper produced by such a machine to enable the shredded paper to be compacted and ejected, for example into bags or into a bale making machine, at a sufficiently high rate to cope with the output of the shredding machine.

SUMMARY OF THE INVENTION

According to the present invention there is provided apparatus for compacting material such as shredded paper, comprising a fluid pressure operated compacting ram movable through a compaction chamber into which material to be compacted is delivered so as to compact the material and displace it into an ejection chamber, an ejection device for ejecting the material from the ejection chamber, control means for effecting automatic operation of the ejection device in response to the compacting ram reaching a stroke limit position, and only after the fluid pressure in said ram has reached a threshold value corresponding to a desired degree of compaction of the material.

The compacting ram would normally be arranged to reciprocate in the compaction chamber, being reversed automatically upon reaching the stroke limit position, unless during the preceding stroke, the fluid pressure in the ram reached the threshold value, in which case, upon reaching the stroke limit position the compacting ram would be halted and the ejection device operated to eject the compacted material from the ejection chamber. Conveniently, a bag or other receptacle may be arranged to receive the compacted material as it is ejected from the ejection chamber.

Various arrangements may be used for ensuring the automatic sequence of operations of the compacting ram and the ejection device. In a preferred embodiment the fluid pressure in the compacting ram, which will be directly related to the degree of compaction of the material in the compaction chamber, is sensed by a pressure switch which, when the pressure reaches the said threshold value, renders a limit switch effective to trip the operation of the ejection device in response to the compaction ram reaching the stroke permit position.

Preferably the compaction ram operates two limit switches upon reaching the stroke limit position, both limit switches being connected to the pressure switch, one of the limit switches being arranged to trip the reversal of the compacting ram when the compacting ram pressure is below the threshold value and the other limit switch being arranged to trip the operation of the ejection device when the compacting ram pressure exceeds the threshold value.

Preferably the compacting ram is movable horizontally through the compaction chamber, the material to be compacted being delivered through an upper opening in the compaction chamber. This permits a simple gravity feeding of the shredded material to the compaction chamber. Preferably the compacting ram carries a horizontal upper wall which closes the opening of the compaction chamber when the compacting ram is advanced towards its stroke limit position. Any shredded material delivered to the compaction chamber while the compacting ram is in its stroke limit position falls onto the upper wall and is subsequently deposited in the compaction chamber when the compacting ram is retracted between successive compacting strokes.

In a preferred embodiment of the invention the ejection device comprises a further fluid pressure operated ram arranged for movement horizontally in a direction perpendicular to the compacting ram. When the compacting ram is arrested at its stroke limit position after sensing of the predetermined fluid pressure in the compacting ram the face of the compacting ram forms one of the walls of the ejection chamber, through which the ejecting ram is subsequently displaced to eject the compacted material.

By a suitable arrangement of limit switches it can be arranged that the compacting and ejecting rams operate in a completely automatic sequence, the operation of the ejecting ram being followed by an automatic retraction of the ejecting ram and a retraction of a compacting ram to an initial position in which the compacting ram is ready to commence a subsequent cycle of compaction strokes. The number of strokes of the compacting ram necessary to achieve the desired degree of compaction of the material will be determined by the setting of the pressure switch responsive to the pressure in the compacting ram. Conveniently this setting would be adjustable to enable different degrees of compaction to be achieved as required.

The shredded paper produced by the apparatus of the invention, which is preferably shredded newsprint, is ideal as animal bedding material, acting as an absorbent neutral carrier for manure. The manure-impregnated shredded paper may itself be treated and then recycled for use as a soil-conditioning or fertilizing material which is relatively clean, effective and easy to handle. The dried or semi-dried product can be applied direct to the ground as a soil-conditioner without any pre-treatment.

The invention accordingly further provides a process for the production of a soil-conditioner or fertilizer in which shredded absorbent paper impregnated with animal excrement or liquid manure is comminuted and at least partially dried to form particles of soil-conditioning or fertilizing material. The comminuted paper may be dried in the air or may be at least partially dried by warm air or by passing the paper through a heater.

By providing a process for the treatment of the manure-impregnated paper, this aspect of the invention is an effective and economic way of treating the animal bedding material after it has been used in order to recycle it as a soil-conditioner or fertilizer in a particularly effective and convenient form.

Preferably the impregnated shredded paper is subjected to mechanical pressure immediately before or during the communication of the paper. Such mechanical pressure may be applied by comminuting the paper by a mincing or grinding action.

In an alternative process according to the invention the shredded paper may be subjected to a drying action before being comminuted. Such a process may comprise the steps of feeding shredded paper impregnated with animal excrement or liquid manure through a drying unit and then pulverising or comminuting the at least partially dried product to produce particles of soil-conditioning or fertilizing material. For carrying out such a process the invention also provides a plant for the production of a soil conditioner or fertilizer comprising a drying unit, means for feeding shredded paper impregnated with animal excrement or liquid manure through the heating unit, and means for pulverising or comminuting the at least partially dried product from the heating unit to produce particles of soil-conditioning or fertilizing material.

The manure-impregnated shredded paper may be subjected to a preliminary breaking operation to subdivide and separate the congealed paper and thereby facilitate the subsequent drying operation. Drying may be carried out by a process having a continuous throughput. Thus in a preferred process a rotary drying barrel may be employed which has its axis of rotation inclined downwardly from its input to its output end, heating being effected by means of hot gases, for example from a gas or oil burner, injected into the lower output end of the barrel so that the impregnated paper to be dried passes through the barrel in counter-flow to the hot gases. The angle of inclination of the barrel to the horizontal, as well as its rotational speed, may be adjustable to enable the rate of throughput of the drying unit, that is, the "dwell time" of the particles in the unit, to be regulated.

Because of its high absorbency the shredded newspaper absorbs most if not all of the liquid content of the animal excrement and this greatly facilitates the operations of cleaning out the manure from the areas where the animals are kept. Moreover, the shredded newspaper bedding material serves to bind together the solid and liquid excrement making it easier to pick up and transport than the manure in its raw state.

The particles of impregnated paper when applied to the ground rapidly release their manure content in the presence of water. The particles of newspaper which have acted as the carrier for the manure degenerate rapidly in the ground and are in themselves effective as a soil aerating material.

The size of the impregnated paper particles produced by the process of the invention may be regulated according to the nature of the soil in which the soil-conditioner or fertilizer is to be used: for heavy soils it may be found desirable in practice to employ relatively large particles which will have a greater clay breaking effect than finely ground particles. For example, the size of the impregnated paper particles may range between fractions of a millimeter to several millimeters, according to the intended use.

The manure-impregnated paper used as the raw material for the process of the invention may be impregnated with further synthetic liquid manure before the drying state. For example liquid plant nutrient may be sprayed on to the partially broken up manure-impregnated newspaper so as to yield a final product which has a higher ferlilizer content than the raw manure.

In practice the shredded newspaper which forms the animal bedding material, and which after impregnation with manure is the raw material for the process of this invention, may itself carry impregnates such as animal repellents or medicaments. The nature and the quantity of these impregnants would be such that they do not affect the usefulness of the dried product as a fertilizer.

BREIF DESCRIPTION OF THE DRAWINGS

The invention will now be described, merely by way of example, with reference to the accompanying purely diagrammatic drawings, in which:

FIG. 5 is a diagrammatic side elevation of a grinding unit which receives the output of the drying unit of FIG. 4.

DETAILED DESCRIPTION OF THE DRAWINGS

Figure 1:
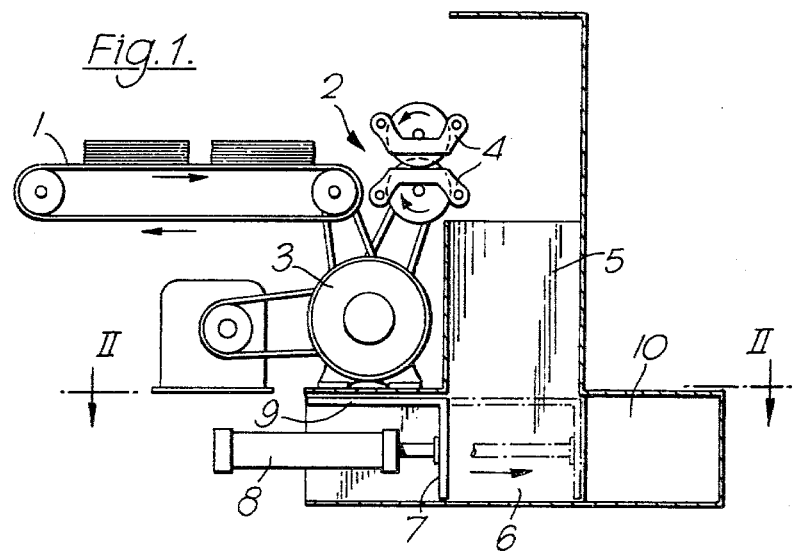
FIG. 1 is a diagrammatic side elevation of a paper shredding plant and compacting apparatus according to the invention.
Figure 2:
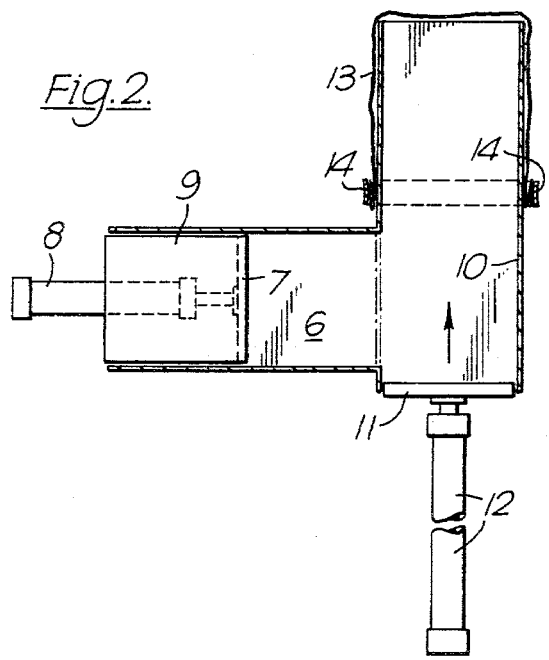
FIG. 2 is a diagrammatic sectional view taken on line II—II of FIG. 1.

Referring first to FIGS. 1 and 2, paper shredding and compacting apparatus is shown in which a substantially horizontal flat feed conveyor 1 is arranged to feed sheets of newspaper into a shredding unit 2 consisting of two sets of power driven intermeshing wheels arranged with their axes horizontal one above the other in a common vertical plane and driven in the direction indicated by the arrows so as to shred by a shearing action paper sheets fed between the nip of the wheels into a number of strips. The feed conveyor 1 and the wheels of the shredding unit 2 are driven from a common electric motor 3 which also drives an hydraulic pump (not shown) powering hydraulic actuators in a compacting and packing apparatus associated with the shredding machine, as hereinafter described.

Each of the two rows of intermeshing cutter wheels includes fixed spacer elements 4, shown diagrammatically, between each adjacent pair of wheels in each row. The spacer elements 4 maintain a correct spacing between the cutter wheels and also define between parallel faces a gap through which sheets to be shredded pass, this gap containing the region of overlap between the cutter wheels of the two rows. The spacer elements 4 also limit the number of sheets which can be fed through the shredding unit, and serve to strip the wheels of any material clinging to them.

Shredded paper emerging from the shredding unit 2 falls into a chute 5 which has convergent side walls and is deposited in a compaction chamber 6 at the bottom of the chute 5. The compaction chamber 6 has a rectangular cross section and has an upper opening communicating with the chute 5 to receive shredded paper from the shredding unit 2.

A compacting ram 7 is movable horizontally through the compaction chamber 6 under control of a first hydraulic actuator 8. The ram 7 is movable from a retracted position, shown diagrammatically in FIG. 1, in which the compaction chamber 6 is completely open to the lower end of the chute 5, and an extended position, indicated in broken outline, in which a horizontal upper wall 9 carried by the compacting ram 7 closes the upper opening of the compaction chamber 6.

In its extended position the compacting ram 7 forms a lateral wall of an ejection chamber 10, also of rectangular cross section, through which an ejection ram 11 is movable horizontally, under control of a second hydraulic actuator 12 the axis of which is perpendicular to that of the first actuator 8. The ejection chamber 10 terminates in a rectangular outlet 13 over which a plastics bag to be filled with the compacted material is placed, the bag forming one wall of the ejection chamber. Opposite sides of the plastics bag 13 may be gripped resiliently against opposite external surfaces of the ejection chamber 10 by means of sprung retaining fingers 14, shown diagrammatically.

In use of the illustrated machine the feed conveyor 1 and shredding unit 2 operate continuously, and the compacting apparatus operates in a continuous cycle.

The compacting ram 7 is reciprocated in the compaction chamber 6 between the positions illustrated in FIG. 1 by means of the actuator 8 to effect compaction of the shredded material deposited into the chamber 6 from the chute 5 in a number of successive compacting stages, the compacted material being displaced into the ejection chamber 10. Towards the end of each compacting stroke of the ram 7 the pressure in the actuator 8 will build up to a value which will be determined by the resistance afforded by the compacted material and, therefore, on the degree of compaction of the material. As the chamber 6 and the ejection chamber 10 fill with material, the reciprocating movement of the compacting ram 7 continues until a stroke is reached in which the pressure applied to the ram actuator 8 exceeds a predetermined value corresponding to a desired degree of compaction of the material in the chamber 10. When this happens the compacting ram 7 instead of being retracted is arrested at the end of its compacting stroke, in the position indicated in broken outline in FIG. 1, and the ejection ram actuator 12 is extended to push the ejection ram 11 through the ejection duct 10, expelling the compacted material from the duct 10 into the bag 13.

It may be arranged that when the bag 13 fills with compacted material it is released automatically from the spring loaded fingers 14 and then sealed, either manually or automatically, preferably by heat-sealing the open end of the bag.

Figure 3:
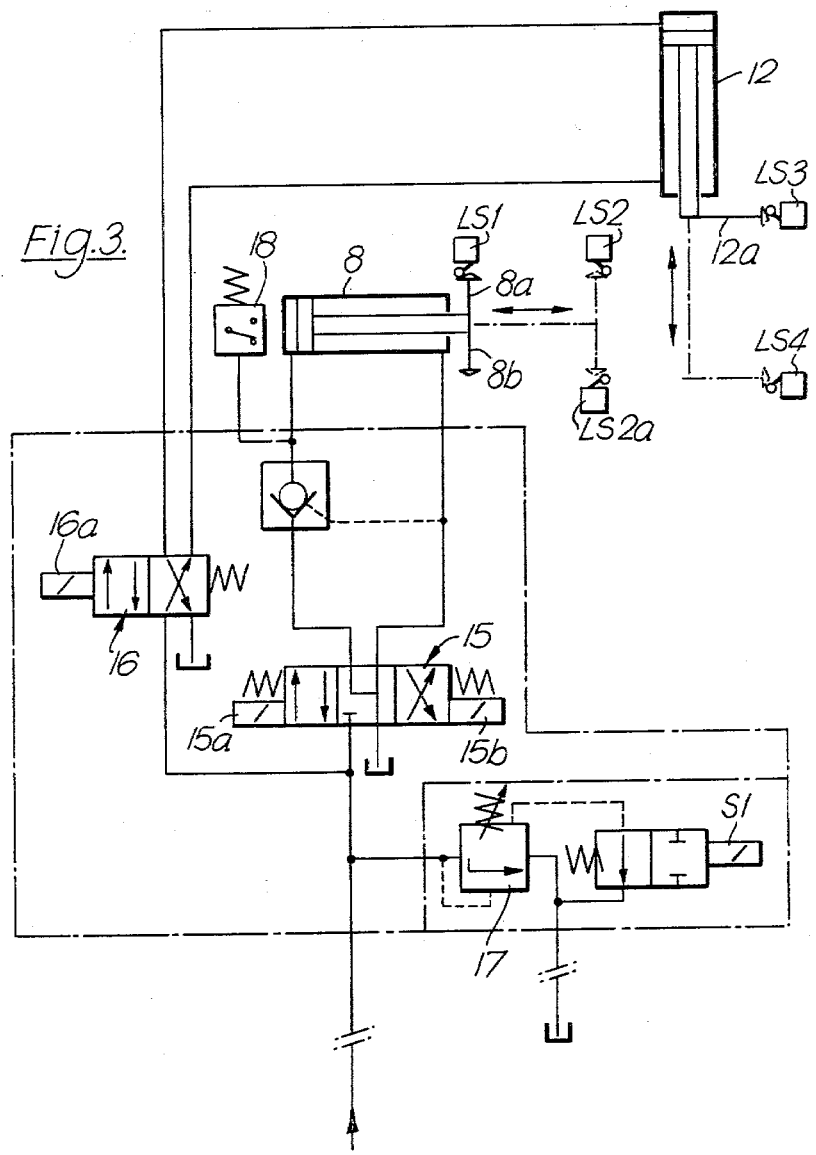
FIG. 3 is a schematic hydraulic circuit of the apparatus.

The sequential operation of the hydraulic actuators 8, 12 controlling the compacting ram 7 and the ejection ram 11 is controlled by an hydraulic control circuit illustrated diagrammatically in FIG. 3, which will be self explanatory. The distribution of hydraulic pressure fluid to the opposite sides of the respective actuator cylinders is controlled by two solenoid-operated distributor valves 15, 16 the respective solenoids 15a, 15b and 16a of which are energised under the control of electrical limit switches LS1, LS2, LS2a, LS3 and LS4 associated with the two ram actuators 8, 12. A cycle of operations commences when a master solenoid S1 is energised, closing a bypass leading from the supply to an hydraulic reservoir so that pressure fluid is supplied to the inlet ports of the two distributor valves 15, 16, the pressure being regulated by a spring loaded pressure relief valve 17.

The electrical connections between the limit switches LS1, LS2, LS2a, LS3 and LS4 and the respective valve operating solenoids 15a, 15b and 16a are not shown in FIG. 3 in the interests of clarity but will be self-evident to those skilled in the art.

At the commencement of a cycle of operations the two actuators 8, 12 are both retracted and the respective solenoids 15a, 15b and 16a associated with the distributor valves 15, 16 are all de-energised. The solenoid 15a is energised by closure of a limit switch LS1 by an operating protuberance 8a carried by the piston of the compacting ram 8 when the latter is fully retracted. This causes an initial extension of the compacting ram until a limit switch LS2 is closed by the action of the ram protuberance 8a, causing the solenoid 15b to be energised and the solenoid 15a to be de-energised. This in turn causes reversal of the hydraulic supply to the compacting ram actuator 8, and retraction of the latter. The reciprocation of the compacting ram actuator 8 continues between the limit switches LS1 and LS2 until the amount of material in the chambers 6 and 10 is such that the hydraulic pressure supplied to the actuator 8 upon each extension stroke reaches a predetermined value to which a pressure switch 18 is pre-set, corresponding to a desired degree of compaction of the material acted upon by the compacting ram 7. When this pressure value is reached the pressure switch 18 is tripped. When this occurs, the control of the solenoids 15a and 15b of the distributor valve 15 is transferred from the limit switch LS2 to the second limit switch LS2a which is positioned to be tripped by a protuberance 8b on the compacting ram 7 when the latter reaches its full extension. The limit switch LS2a, when tripped, upon the compaction of the compacting stroke in which the pressure switch 18 is tripped, causes both solenoids 15a, 15b to be de-energized, arresting the movement of the compacting ram actuator 8 at its full extension, and at the same time causes energisation of the solenoid 16a to supply hydraulic fluid to the ejection ram actuator 12, extending the latter to expel the compacted material from the ejection duct 10.

When the ejection ram 12 reaches the full extent of its travel a limit switch LS4 is tripped by a protuberance 12a on the piston of the ram 12, causing de-energisation of the solenoid 16a and reversal of the hydraulic pressure fluid supply to the actuator 12, so that the ejection ram 12 is retracted. Upon reaching its fully retracted position the protuberance 12a on the ejection ram 12 trips a limit switch LS3 which energises the solenoid 15b to cause retraction of the compacting ram actuator 8. During the retraction of the compacting ram 8 the pressure switch 18 will revert to its initial setting, and consequently when the retracting ram actuator 8 reaches its fully retracted position the limit switch LS1 will be tripped and a further cycle of operations will commence.

It will be noted that the compacting ram 8 always effects a full compacting stroke between the limit switches LS1 and LS2, the commencement of an ejection stroke of the ejection ram 12 being initiated at the end of the stroke in which the preset pressure of the pressure switch 18 is exceeded. This avoids the necessity to have an accurately predetermined setting of the pressure switch and ensures that the compacting ram always travels to the full extent of its stroke before compacted material is injected.

Figure 4:
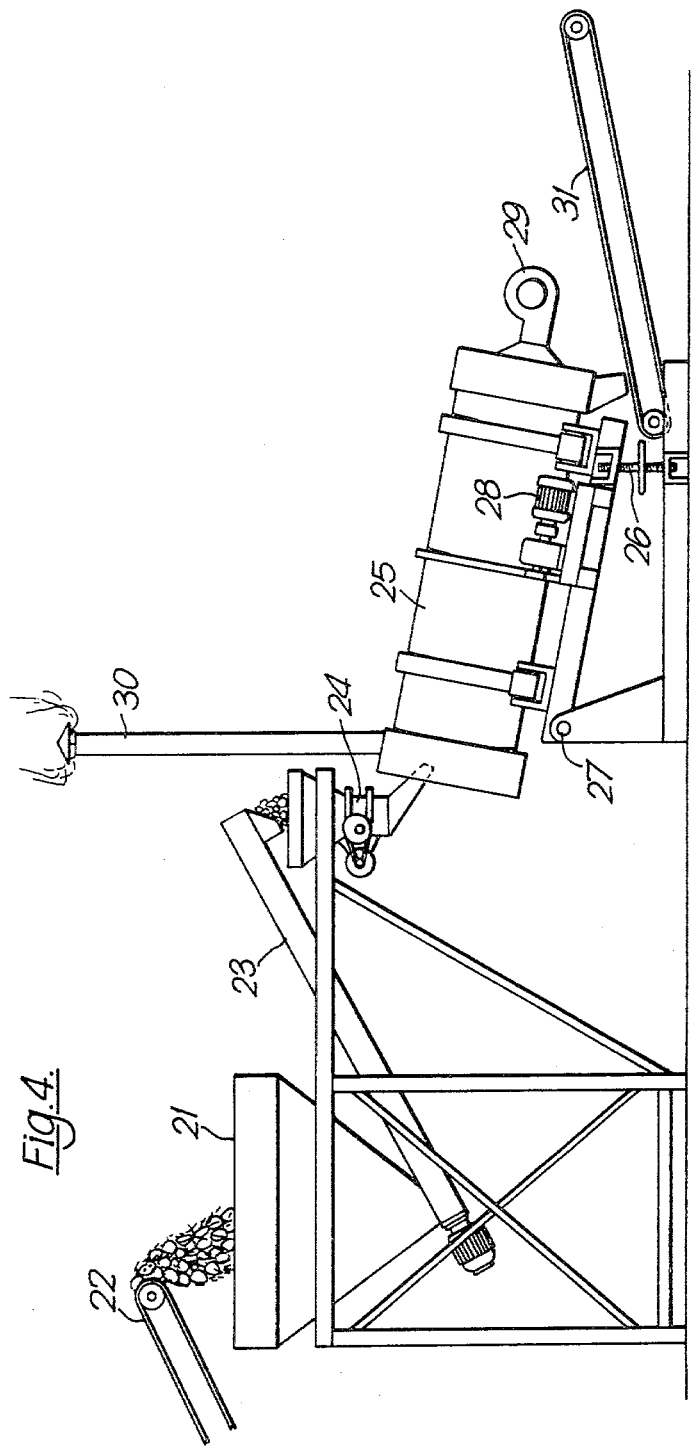
FIG. 4 is a diagrammatic side elevation of a feeding arrangement and drying unit of a plant for the production of fertilizer in accordance with one embodiment of another aspect of the present invention.

The plant shown diagrammatically in FIGS. 4 and 5 is intended for the communition and at least partial drying of shredded paper fed to the unit after use, that is, after soiling of the shredded paper with animal manure through use, for example over a 24 hour period.

Referring to FIG. 4, a bulk feed hopper 21 is arranged to receive from a belt feed conveyor 22 shredded newspaper impregnated with liquid and solid animal manure, which has been collected from farms after use as animal bedding and cleaning material. The impregnated newspaper is fed from the hopper 21 by a screw conveyor 23 into a preliminary breaking unit which consists of an electrically powered screw device 24, which subdivides the congealed shredded newspaper and breaks it up into smaller pieces, typically measuring about one centimeter square. These pieces may be allowed to dry partially in the air before being bagged for distribution and sale as a soil-conditioner. Alternatively, the pieces may be dried completely, as in the illustrated embodiment, by feeding them into a rotary drier barrel 25. The axis of rotation of the barrel 25 is inclined downwardly from the input end of the barrel, the angle of inclination being adjustable by means of a screw mechanism 26 which supports the rear end of the barrel, the upper being pivotally supported above the horizontal hinge axis 27. The barrel is supported on a roller cradle and is rotated continuously by means of an electric motor 28. Drying is effected by hot gases injected into the lower end of the barrel by means of an oil or gas fired burner unit, 29, the hot gases and burner products after flowing through the barrel in counter-current to the impregnated paper escape through a flue 30.

The dried paper is deposited upon a belt conveyor 31 (FIG. 5) and passes to an electrically powered grinder 32 consisting in this example of a horizontal turntable which is driven continuously by an electric motor 33 about a vertical axis beneath a grinding wheel 34. The ground newspaper, in the form of a dried powder or dried particles, falls through mesh holes in the grinding table and is conveyed by a conveyor 36 to a storage hopper 37. The dried products may be bagged or may be stored and transported in bulk form for application to the ground as a soil-conditioner or fertilizer.

It is also envisaged in an alternative method of carrying out this aspect of the invention that the shredded paper may be broken up by feeding it through a rotary cutter or impeller driven at high speed, the rotation of the cutter or impeller itself inducing or assisting the flow of the material to be broken up, in the manner of the cutters employed in some grass-cutting equipment.

A typical analysis of the end product of a process according to the invention applied to shredded newspaper impregnated with chicken manure has yielded the following comparative results:

| ANALYSIS of Available Nitrogen, Phosphates and Potash | | | | |
|---|---|---|---|---|
| | (Parts by Weight) | | | % |
| | N | $P_2O_5$ | $K_2O$ | moisture |
| (a) Raw chicken manure: | 14.5 | 11.0 | 10.5 | 30% |
| (b) Dried impregnated paper particles of the present invention: | 34.0 | 10.0 | 15.0 | low |

The product (b) also included approximately 3.0 parts by weight of magnesium. The comparison with raw chicken manure (a) is seen to be very favorable.

We claim:
1. Apparatus for the shredding, compacting and packing of paper, particularly waste newspapers, said apparatus comprising,
  (a) means for shredding sheets of paper,
  (b) guide means for feeding paper sheets to be shredded to the said shredding means,
  (c) a press having a compaction chamber,
  (d) means for delivering shredded paper from the said shredding means to the compaction chamber of said press,
  (e) a fluid pressure-actuated compacting ram movable through the compaction chamber and adapted to compact shredded paper therein,
  (f) an ejection chamber arranged to receive compacted shredded paper from the compaction chamber, the discharge end of the ejection chamber having a bag placed thereover, the bag forming one wall of the ejection chamber,
  (g) an ejection device for ejecting shredded paper from the ejection chamber and into said bag,
  (h) means responsive to fluid pressure in said compacting ram to provide an enabling output only when said fluid pressure which actuates the ram reaches a predetermined threshold value corresponding to a desired degree of compaction of the shredded paper,
  (i) control means operable in response to said enabling output to enable the said ejection device for operation thereafter when the said ram reaches a predetermined limit position of its compacting stroke.

2. Apparatus as defined in claim 1, wherein the pressure responsive means comprise a pressure switch which, when the pressure in the compacting ram reaches the said predetermined value, operates to provide said enabling output, and said control means include a limit switch responsive to said ram reaching the stroke limit position to trip the operation of the ejection device, said limit switch being rendered responsive to the ram reaching said limit position by the enabling output of the pressure responsive means.

3. Apparatus as defined in claim 1, wherein the compacting ram is movable horizontally through the compaction chamber, the material delivery means including an upper opening in the compaction chamber and the compacting ram carrying a horizontal upper wall whch closes said opening when the compacting ram is advanced towards it stroke limit position.

4. Apparatus as defined in claim 2, including two limit switches which cooperate with the compacting ram at said stroke limit position thereof, both limit switches being connected to the pressure switch, one of the limit switches being connected to the compacting ram to reverse the latter when the ram pressure is below said threshold value and the other limit switch tripping the operation of the ejection device when the compacting ram pressure exceeds said threshold value.

* * * * *